US012738250B2

(12) United States Patent
Kim

(10) Patent No.: US 12,738,250 B2
(45) Date of Patent: Sep. 15, 2026

(54) DISPLAY, METHOD AND ELECTRONIC DEVICE WITH REGION-SPECIFIC BLACK VOLTAGE DATA

(71) Applicant: SAMSUNG DISPLAY CO., LTD., Yongin-si (KR)

(72) Inventor: Woung Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/182,085

(22) Filed: Apr. 17, 2025

(65) Prior Publication Data

US 2025/0384856 A1 Dec. 18, 2025

(30) Foreign Application Priority Data

Jun. 18, 2024 (KR) ........................ 10-2024-0078779
Oct. 4, 2024 (KR) ........................ 10-2024-0134530

(51) Int. Cl.

*G09G 3/36* (2006.01)
*G09G 3/32* (2016.01)
*G09G 3/3275* (2016.01)

(52) U.S. Cl.

CPC ............. *G09G 3/3696* (2013.01); *G09G 3/32* (2013.01); *G09G 3/3275* (2013.01); *G09G 2300/0861* (2013.01); *G09G 2310/0275* (2013.01); *G09G 2310/08* (2013.01); *G09G 2320/0238* (2013.01); *G09G 2320/0276* (2013.01); *G09G 2360/16* (2013.01)

(58) Field of Classification Search

CPC ...... G09G 3/3696; G09G 3/32; G09G 3/3275; G09G 2300/0861; G09G 2310/0275; G09G 2310/08; G09G 2320/0238; G09G 2320/0276; G09G 2360/16

See application file for complete search history.

(56) References Cited

U.S. PATENT DOCUMENTS

| | | | | |
|---|---|---|---|---|
| 2007/0132709 A1* | 6/2007 | Kawaguchi | .......... | G09G 3/3406 345/102 |
| 2007/0176882 A1* | 8/2007 | Araki | .................. | G09G 3/3648 345/101 |
| 2019/0130827 A1* | 5/2019 | Pyo | ...................... | G09G 3/3233 |
| 2023/0136391 A1* | 5/2023 | Hong | .................. | G09G 3/3225 345/694 |
| 2024/0412676 A1* | 12/2024 | Kim | ..................... | G09G 3/3233 |
| 2025/0322783 A1* | 10/2025 | Kim | ..................... | G09G 3/3233 |

FOREIGN PATENT DOCUMENTS

KR 10-2469801 B1 11/2022

* cited by examiner

*Primary Examiner* — Rodney Amadiz
(74) *Attorney, Agent, or Firm* — F. CHAU & ASSOCIATES, LLC

(57) ABSTRACT

A display device includes a display panel including sub-pixels, a data driver for providing the sub-pixels with a data voltage generated using a gamma reference voltage, a driving controller for controlling the data driver, and a memory storage for providing the driving controller with black data voltage information of a first area of the display panel according to a driving frequency, a dimming level, and a temperature of the display panel.

20 Claims, 20 Drawing Sheets

S220

S220

S220

DISPLAY, METHOD AND ELECTRONIC DEVICE WITH REGION-SPECIFIC BLACK VOLTAGE DATA

CROSS-REFERENCE TO RELATED APPLICATION

The present application claims priority under 35 U.S.C. § 119(a) to Korean patent application No. 10-2024-0078779, filed on Jun. 18, 2024, in the Korean Intellectual Property Office, and to Korean patent application No. 10-2024-0134530, filed on Oct. 4, 2024, in the Korean Intellectual Property Office, the entire disclosures of which are herein incorporated by reference.

BACKGROUND

1. Technical Field

The present disclosure generally relates to a display device, a manufacturing method thereof, a driving method thereof, and an electronic device using the display device, and more particularly to a display device that may reduce a difference in luminance between areas.

2. Discussion of Related Art

In general, a display device includes a display panel, gate driver, a data driver, and a driving controller. The display panel includes a plurality of gate lines, a plurality of data lines, and a plurality of sub-pixels electrically connected to the plurality of gate lines and the plurality of data lines. The gate driver provides gate signals to the gate lines, the data driver provides data voltages to the data lines, and the driving controller controls the gate driver and the data driver.

In a display device which supports variable frequency driving, a time for which a data voltage is not written in a frame may vary according to a driving frequency. In addition, as the time is lengthened, an amount of current leaked through a switching transistor of a sub-pixel may be increased, and a luminance difference (e.g., between adjacent pixels) may be caused due to the leaked current.

SUMMARY

Embodiments provide a display device for controlling a black data voltage.

Embodiments also provide a manufacturing method of the display device.

Embodiments also provide a driving method of the display device.

In accordance with an aspect of the present disclosure, there is provided a display device including: a display panel including sub-pixels; a data driver configured to provide the sub-pixels with a data voltage generated using a gamma reference voltage; a driving controller configured to control the data driver; and a memory storage configured to provide the driving controller with black data voltage information of a first area of the display panel according to a driving frequency, a dimming level, and a temperature of the display panel.

The driving controller may calculate an area-specific correction value for a second area of the display panel using the black data voltage information.

The driving controller may control the data driver to remap a relationship between the gamma reference voltage and the data voltage for the second area, using the black data voltage information and the area-specific correction value.

The driving controller may generate area-specific black data voltage of the second area, using the black data voltage information and the area-specific correction value. The driving controller may transfer, to the data driver, the area-specific black data voltage, causing the data driver to remap, for the second area, a relationship between the gamma reference voltage and the data voltage.

When the driving frequency is changed, the driving controller may re-calculate the area-specific correction value using the black data voltage information and a changed value of the driving frequency. The driving controller may control the data driver to remap, for the second area, a relationship between the gamma reference voltage and the data voltage, using the black data voltage information and a recalculated value of the area-specific correction value, wherein the remap reduces a difference in luminance between the first area and the second area.

The display device may further include: a gate driver configured to provide a gate signal to the sub-pixels; a driving voltage generator configured to supply the gamma reference voltage to the data driver, and supply a gate high voltage to the gate driver; and a power supply configured to supply a source voltage to the driving voltage generator.

The driving controller may calculate a correction value for the gate high voltage, using the area-specific correction value, and control the driving voltage generator to supply the gate high voltage corrected using the correction value. The driving controller may calculate a correction value for the source voltage, using the correction value for the gate high voltage, and control the power supply to supply the source voltage calculated using the correction value for the source voltage.

The driving controller may include: an area-specific correction value calculation unit configured to receive the black data voltage information provided from the memory storage, and calculate the area-specific correction value; a remapping unit configured to receive the area-specific correction value transferred from the area-specific correction value calculation, and control the data driver to perform remapping; and a driving operation unit configured to control the driving voltage generator and the power supply.

In accordance with another aspect of the present disclosure, there is provided a method of driving a display device including a data driver and a display panel which is divided into a plurality of areas and includes sub-pixels, the method including: acquiring, from a memory storage, black data voltage information according to a driving frequency, a dimming level, and a temperature for a first area of the display panel; calculating an area-specific correction value for a second area of the display panel using the acquired black data voltage information; and controlling data voltage generation of the data driver using the area-specific correction value to vary the driving frequency, the dimming level, and the temperature for the second area of the display panel.

The controlling of the data voltage generation of the data driver may include: generating an area-specific black data voltage for the second area using an area-specific black data set voltage and the area-specific correction value; transferring, to the data driver, the area-specific black data information; and controlling the data driver to remap, for the second area, a relationship between a gamma reference voltage and a data voltage, using the area-specific black data voltage to reduce a difference in luminance between the first area and the second area.

The display device may further include: a gate driver configured to provide a gate signal to the sub-pixels; a driving voltage generator configured to supply the gamma reference voltage to the data driver, and supply a gate high voltage to the gate driver; and a power supply configured to supply a source voltage to the driving voltage generator. The method may further include controlling the driving voltage generator and the power supply.

The controlling of the driving voltage generator and the power supply may include: calculating a correction value for the gate high voltage, using the area-specific correction value, and controlling the driving voltage generator to supply the gate high voltage adjusting using the correction value for the gate high voltage; and calculating a correction value for the source voltage, using the correction value for the gate high voltage, and controlling the power supply to supply the source voltage adjusted using the correction value for the source voltage.

The method may further include: when the driving frequency is changed, re-calculating an area-specific correction value using the black data voltage information; and controlling the data voltage generation of the data driver with respect to the area-specific correction value re-calculated using the black data voltage information.

The method may further include: searching for a black data voltage corresponding to a target luminance with respect to the first area of the display panel, wherein the first area is a reference area of the display panel; calculating an area-specific weighted value with respect to the second area, and calculating a black data voltage corresponding to the target luminance; and storing information on the black data voltage in the memory storage as the black data voltage information.

The reference area may correspond to a central area of the display panel.

The black data voltage may correspond to a driving frequency, a dimming level, and a temperature of the display panel.

In accordance with still another aspect of the present disclosure, there is provided an electronic device including: a display device configured to display an image; a power device configured to supply power for an operation of the display device; and a processor configured to supply signals to the display device, wherein the display device includes: a display panel including sub-pixels; a data driver configured to provide the sub-pixels with a data voltage generated using a gamma reference voltage; a driving controller configured to control the data driver; and a memory storage configured to provide the driving controller with black data voltage information of a first area of the display panel according to a driving frequency, a dimming level, and a temperature of the display panel.

The driving controller may calculate an area-specific correction value for a second area of the display panel using the black data voltage information.

The driving controller may control the data driver to remap a relationship between the gamma reference voltage and the data voltage for the second area, using an area-specific black data set voltage and the area-specific correction value.

The driving controller may generate area-specific black data voltage of the second area, using the black data voltage information and the area-specific correction value. The driving controller may transfer, to the data driver, the area-specific black data voltage, causing the data driver to remap, for the second area, a relationship between the gamma reference voltage and the data voltage.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
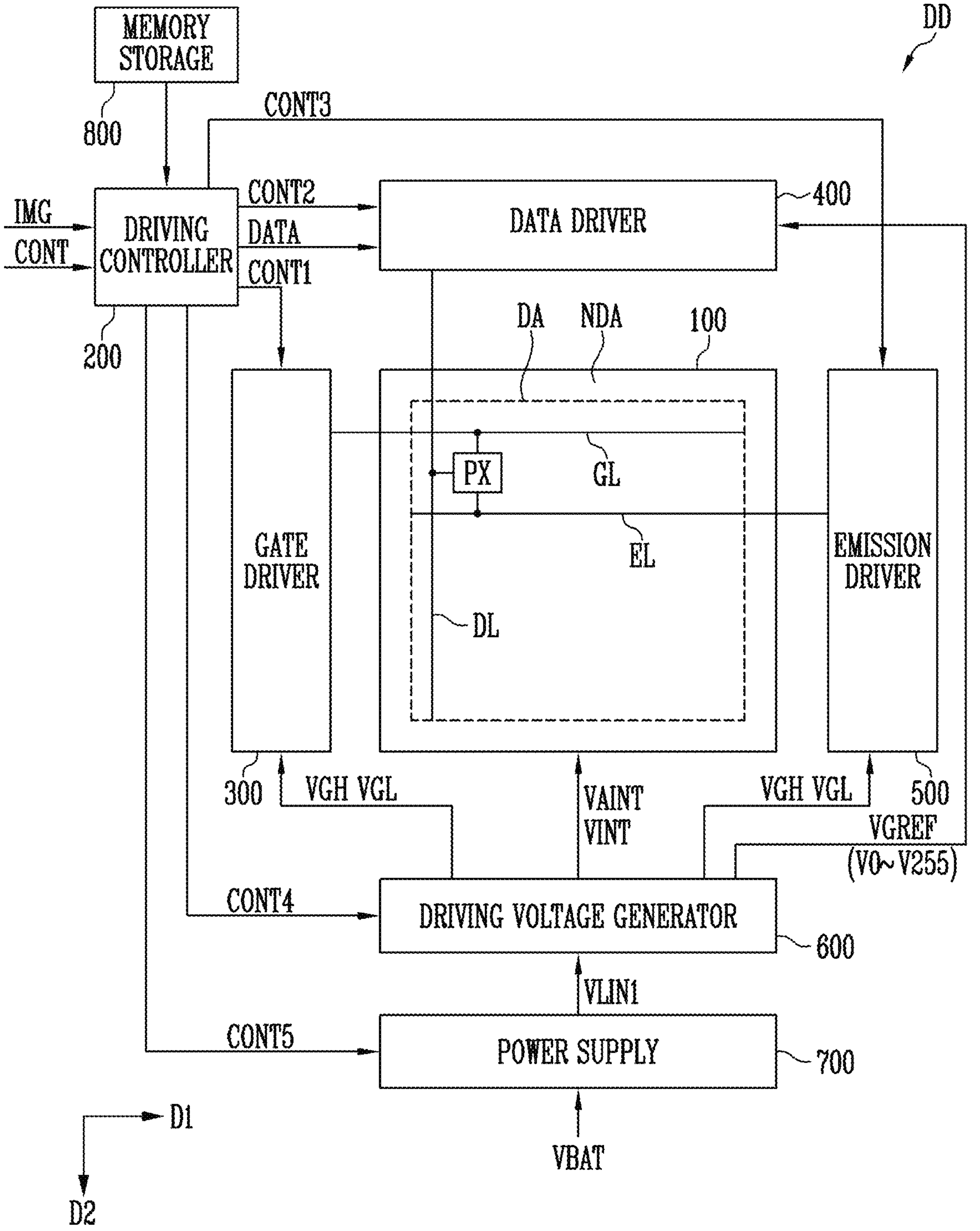
FIG. 1 is a block diagram illustrating a display device in accordance with embodiments of the present disclosure.

Example embodiments will now be described more fully hereinafter with reference to the accompanying drawings; however, they may be embodied in different forms and should not be construed as limited to embodiments set forth herein. Rather, embodiments are provided so that this disclosure will be thorough and complete, and will fully convey the scope of example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Hereinafter, embodiments of the present disclosure will be described in more detail with reference to the accompanying drawings. In the description, parts needed to understand an operation according to the present disclosure are described and the descriptions of other parts may be omitted in order not to unnecessarily obscure subject matters of the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to the other element or the element may be indirectly connected or coupled to the another element with one or more intervening elements interposed therebetween. The technical terms used herein are used for the purpose of illustrating a specific embodiment and are not intended to limit embodiments. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed herein could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

In addition, embodiments of the disclosure described here with reference to schematic diagrams of ideal structures (and an intermediate structure) of the present disclosure, so that changes in a shape as shown due to, for example, manufacturing technology and/or a tolerance may be expected. Therefore, embodiments of the present disclosure shall not be limited to the specific shapes of a region shown here, but include shape deviations caused by, for example, the manufacturing technology. The regions shown in the drawings may be schematic in nature, and the shapes thereof may not represent the actual shapes of the regions of the device, and do not limit the scope of the disclosure.

According to an aspect of the present disclosure, a driving controller may determine a black data voltage for an area of a display panel using a correction value so that a luminance difference between different areas may be reduced or minimized. The black data voltage may be stored as black data voltage information for a reference area of the display panel and provided to the driving controller.

FIG. 1 is a block diagram illustrating a display device in accordance with embodiments of the present disclosure.

Referring to FIG. 1, the display device DD may include a display panel 100, a driving controller 200, a gate driver 300, a data driver 400, an emission driver 500, a driving voltage generator 600, a power supply 700, and a memory storage 800. In an embodiment, the driving controller 200 and the data driver 400 may be integrated into a single chip. In an embodiment, the driving controller 200, the data driver 400, and the driving voltage generator 600 may be integrated into a single chip.

The display panel 100 may include a display area DA in which an image is displayed and a non-display area NDA disposed adjacent to the display area DA. For example, the non-display area NDA may surround at least a portion of the display area DA In an embodiment, the gate driver 300 and the emission driver 500 may be mounted in the non-display area NDA.

The display panel 100 may include a plurality of gate lines GL, a plurality of data lines DL, a plurality of emission lines EL, and a plurality of pixels PX electrically connected to the gate lines GL, the data lines DL, and the emission lines EL. Each of the pixels PX may include first to third sub-pixels, however embodiments are not limited thereto, and pixels PX may include a different number of sub-pixels. The gate lines GL and the emission lines EL may extend in a first direction DR1, and the data lines DL may extend in a second direction DR2 intersecting the first direction DR1. While the gate lines GL, emission lines EL, and data lines DL are illustrated using example lines, it should be understood that each of the gate lines GL, emission lines EL, and data lines DL may be provided as a plurality of lines.

The driving controller 200 may receive input image data IMG and an input control signal CONT from a processor 1010 (see FIG. 19) (e.g., a graphic processing unit (GPU) or the like). For example, the input image data IMG may include red image data, green image data, and blue image data. In an embodiment, the input image data IMG may further include white image data. In another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA. The driving controller 200 may generate these signals based on the input image data IMG and the input control signal CONT.

The driving controller 200 may generate the first control signal CONT1 for controlling an operation of the gate driver 300, based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 400, based on the input control signal CONT, and output the second control signal CONT2 to the data driver 400. The second control signal CONT2 may include a horizontal start signal and a load signal.

The driving controller 200 may generate the data signal DATA by receiving the input image data IMG and the input control signal CONT. The driving controller 200 may output the data signal DATA to the data driver 400.

The driving controller 200 may generate the third control signal CONT3 for controlling an operation of the emission driver 500, based on the input control signal CONT, and output the third control signal CONT3 to the emission driver 500. The third control signal CONT3 may include a vertical start signal and an emission clock signal.

The driving controller 200 may generate the fourth control signal CONT4 for controlling an operation of the driving voltage generator 600, based on the input control signal CONT, and output the fourth control signal CONT4 to the driving voltage generator 600. The driving voltage generator 600 may output driving voltages VGH, VGL, VINT, and VAINT as voltage values determined by the driving controller 200.

The driving controller 200 may generate the fifth control signal CONT5 for controlling an operation of the power supply 700, based on the input control signal CONT, and output the fifth control signal CONT5 to the power supply 700. The power supply 700 may output a source voltage VLIN1 as a voltage value determined by the driving controller 200. The power supply 700 may output a source voltage VLIN1 to the driving voltage generator 600.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT and the data signal DATA, which may be input from the driving controller 200. The data driver 400 may generate data voltages obtained by converting the data signal DATA into a voltage in an analog form. The data driver 400 may output the data voltages to the data lines DL.

The emission driver 500 may generate emission signals for driving the emission lines EL in response to the third control signal CONT3 input from the driving controller 200. The emission driver 500 may output the emission signals to the emission lines EL. For example, the emission driver 500 may sequentially output the emission signals to the emission lines EL.

The driving voltage generator 600 may provide a gate high voltage VGH and a gate low voltage VGL to the gate driver 300 and the emission driver 500 in response to the fourth control signal CONT4 input from the driving controller 200. The gate high voltage VGH may be a voltage corresponding to a high voltage level of a gate signal, and the gate low voltage VGL may be a voltage corresponding to a low voltage level of the gate signal.

The driving voltage generator 600 may apply a first initialization voltage VINT and a second initialization voltage VAINT to the display panel 100 in response to the fourth control signal CONT4 input from the driving controller 200.

The driving voltage generator 600 may provide a gamma reference voltage VGREF to the data driver 400. The driving voltage generator 600 may provide a gamma reference voltage VGREF to the data driver 400 in response to the fourth control signal CONT4 input from the driving controller 200. The gamma reference voltage VGREF may include a data voltage V0 of grayscale 0 to a data voltage V255 of grayscale 255. For example, the gamma reference voltage VGREF may be divided using a resistor or the like. Some of the divided voltages may become the data voltages V0 to V255 of grayscales 0 to 255. It may be defined that the some of the divided voltages and the data voltages V0 to V255 of grayscales 0 to 255 are mapped to each other. For example, a gray scale value of image data may be converted into the data signal using the gamma voltage. The gamma reference voltage VGREF with a data voltage V0 of grayscale 0 may be a black data voltage. A black data voltage (e.g., a data voltage V0 of grayscale 0) may correspond to a black color.

Which voltages among the divided voltages become the data voltages V0 to V255 of grayscales 0 to 255 may vary according to a temperature, a driving frequency, a dimming level, and the like of the display panel 100 for each area of the display panel 100. In some cases, the voltages used as the data voltages V0 to V255 of grayscales 0 to 255 among the divided voltages may be changed. A change in the mapping of the voltages used as the data voltages V0 to V255 of grayscales 0 to 255 among the divided voltages may be defined as remapping.

The data driver 400 may output a data voltage of each grayscale, using the gamma reference voltage VGREF.

The power supply 700 may provide the source voltage VLIN1 to the driving voltage generator 600. The power supply 700 may provide the source voltage VLIN1 to the driving voltage generator 600 in response to the fifth control signal CONT5 input from the driving controller 200. The power supply 700 may receive a second external voltage VBAT to generate the source voltage VLIN1. More specifically, the power supply 700 may receive the second external voltage VBAT input from a power source module 1150 (see FIG. 19). For example, the power supply 700 may be a power management integrated circuit (PMIC).

In embodiments of the present disclosure, the memory storage 800 may include luminance-specific black data voltage information on a reference area (e.g., a central area of the display panel 100). Similarly, the memory storage 800 may include luminance-specific black data voltage information calculated for other areas (e.g., areas except the central area of the display panel 100). The luminance-specific black data voltage information for the other areas may be calculated as an area-specific weighted value for the reference area (e.g., the central area of the display panel 100). For example, a value of the reference area may be multiplied by area-specific weights to obtain the luminance-specific black data voltage information for each of the other areas. The black data voltage information may be stored in the memory storage 800. The black data voltage information may be stored in the memory storage 800 in accordance with a command received from a user, a mechanical device, or the like in a processing process. This will be described with reference to FIG. 7, FIG. 8, and FIG. 9.

In embodiments, the black data voltage information may be information for displaying a black image with a desired luminance (or target luminance), corresponding to a variable driving frequency (e.g., a driving frequency of the display panel 100), a variable dimming level, and/or a variable temperature (e.g., a temperature of the display panel 100).

The driving controller 200 may acquire information on the black data voltage from the memory storage 800. Also, the driving controller 200 may calculate an area specific correction value V0_offset (see FIG. 16) for displaying a black image with a desired luminance under a set driving frequency, a set dimming level, and/or a set temperature, based on the acquired information.

Also, the driving controller 200 may obtain a black data voltage (V0) value for each area by adding the area-specific correction value V0_offset (see FIG. 16) to a black data set value V0_SET. The black data set voltage V0_SET may be a value input to the driving controller 200 by the user. The black data set voltage V0_SET may be varied through setting. By considering this, the driving controller 200 may calculate the area specific correction value V0_offset. This will be described with reference to FIG. 12 and FIG. 13.

In some cases, in an embodiment, the driving controller 200 may individually calculate an area-specific correction value V0_offset with respect to sub-pixels SP of each of the pixels PX included in the areas of the display panel 100, based on the acquire information. Also, the driving controller 200 may obtain a black data voltage (V0) value for each area by adding the calculated area-specific correction value V0_offset to a black data set voltage V0_SET individually set in each of the sub-pixels. This will be described with reference to FIG. 14 and FIG. 15.

The driving controller 200 may transfer information on the calculated black data voltage (V0) value for each area to the data driver 400, allowing the data driver 400 to re-set, for each area, a correspondence relationship between the data voltages V0 to V255 of the grayscales 0 to 255 and the gamma reference voltage VGREF. In other words, by the driving controller 200, the data driver 400 may remap, for each area, the relationship between the gamma reference voltage VGREF and the data voltages V0 to V255 of the grayscales 0 to 255. Accordingly, in order to display a black image of the same grayscale, magnitudes of data voltages to be supplied for each area of the display panel 100 may be different from or equal to each other. The data driver 400 may supply data voltages for each area of the display panel 100, using the gamma reference voltage VGREF, to display a black image with a desired luminance.

The driving controller 200 may control the driving voltage generator 600 and the power supply 700 when a black image with a desired luminance cannot be displayed for each area through only remapping in the data driver 400. For example, the driving controller 200 may control the driving voltage generator 600 and the power supply 700 when the black data voltage V0 to which the area-specific correction value V0_offset is added cannot be made using the gamma reference value VGREF through only the remapping in the data driver 400.

For example, the driving controller 200 may calculate a correction value VGH_offset for the gate high voltage VGH from the calculated area-specific correction value V0_offset. Also, the driving controller 200 may control the driving voltage generator 600 to supply an adjusted gate high voltage VGH' by adding the correction value VGH_offset for the gate high voltage VGH to the existing gate high voltage VGH. For example, the gate high voltage VGH may be adjusted using the correction value VGH_offset for the gate high voltage VGH.

For example, the driving controller 200 may calculate a correction value VLIN1_offset for the source voltage VLIN1 from the calculated correction value VGH_offset for the gate high voltage VGH. Also, the driving controller 200 may control the power supply 700 to supply an adjusted source voltage VLIN1' by adding the correction value VLIN1_offset for the source voltage VLIN1 to the existing source voltage VLIN1. For example, the source voltage VLIN1 may be adjusted using the correction value VLIN1_offset for the source voltage VLIN1.

Figure 2:
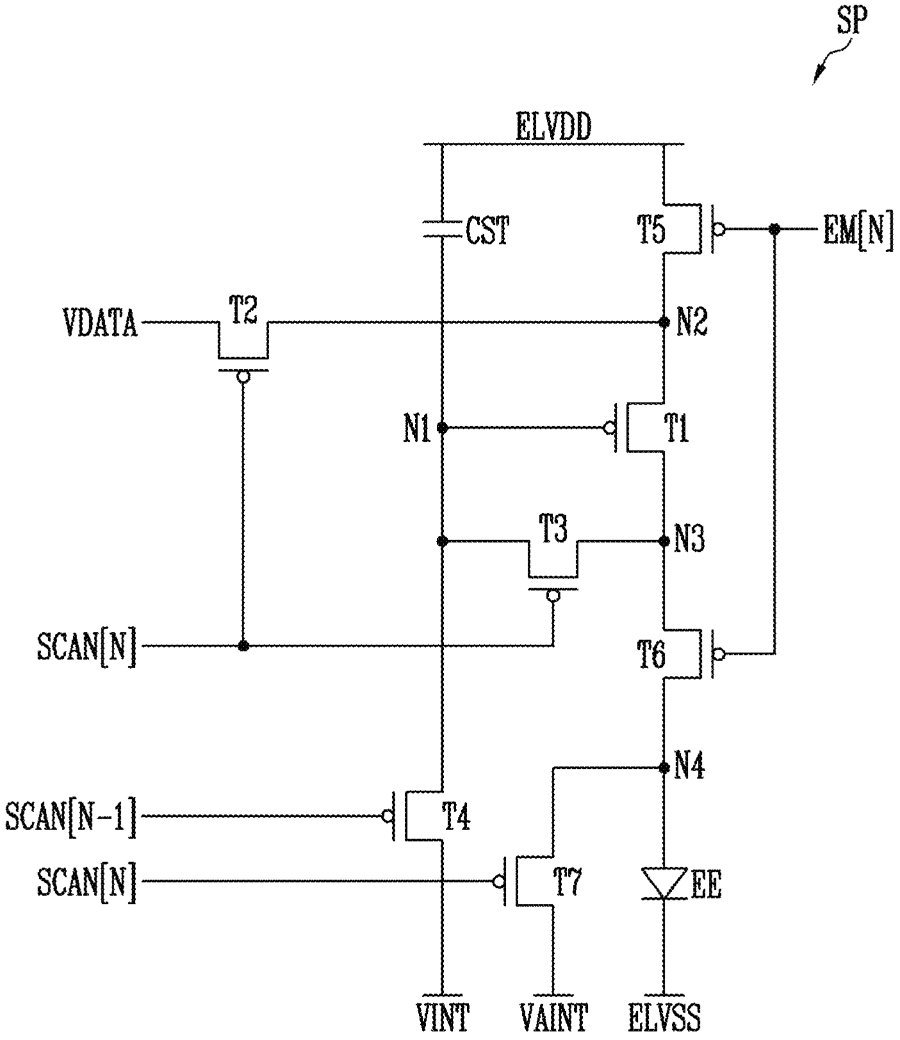
FIG. 2 is a circuit diagram illustrating an example of a sub-pixel of the display device shown in FIG. 1.

FIG. 2 is a circuit diagram illustrating an example of the sub-pixel of the display device shown in FIG. 1.

Referring to FIG. 2, each of the sub-pixels SP may include a driving transistor T1, switching transistors T2 to T7, and a light emitting element EE. In some embodiments, each of the pixels PX may include first to third sub-pixels SP, however embodiments are not limited thereto, and pixels PX may include a different number of sub-pixels. In addition, different ones of the sub-pixels SP may emit light of different colors. The first sub-pixel may emit light of a red light, the second sub-pixel may emit light of a green light, and the third sub-pixel may emit light of a blue light. However, the present disclosure is not limited thereto.

Each of the sub-pixels SP may include a first transistor, which may be the driving transistor, including a control electrode connected to a first node N1, a first electrode connected to a second node N2, and a second electrode connected to a third node N3, a second transistor including a control electrode receiving a gate signal SCAN[N], a first electrode receiving a data voltage VDATA, and a second electrode connected to the second node N2, a third transistor T3 including a control electrode receiving the gate signal SCAN[N], a first electrode connected to the third node N3, and a second electrode connected to the first node N1, a fourth transistor T4 including a control electrode receiving a gate signal SCAN[N−1] of a previous pixel row, a first electrode receiving a first initialization voltage VINT, and a second electrode connected to the first node N1, a fifth transistor T5 including a control electrode receiving an emission signal EM [N], a first electrode receiving a first power voltage ELVDD (e.g., a high power voltage), and a second electrode connected to the second node N2, a sixth transistor T6 including a control electrode receiving the emission signal EM [N], a first electrode connected to the third node N3, and a second electrode connected to a fourth node N4, a seventh transistor T7 including a control electrode receiving the gate signal SCAN[N], a first electrode receiving a second initialization voltage VAINT, and a second electrode connected to the fourth node N4, a storage capacitor CST including a first electrode receiving the first power voltage ELVDD and a second electrode connected to the first node N1, and the light emitting element EE including a first electrode (i.e., an anode electrode) connected to the fourth node N4 and a second electrode (i.e., a cathode electrode) receiving a second power voltage ELVSS (e.g., a low power voltage). However, the present disclosure is not limited thereto. For example, each of the sub-pixels SP may have a 3T1C structure including three transistors and one capacitor, a 5T2C structure including five transistors and two capacitors, a 7T1C structure including seven transistors and one capacitor, or a 9T1C structure including nine transistors and one capacitor.

The first to seventh transistors T1, T2, T3, T4, T5, T6, and T7 may be implemented with a p-channel metal oxide semiconductor (PMOS) transistor. A low voltage level may be an activation level, and a high voltage level may be an inactivation level. For example, when a signal applied to a control electrode of the PMOS transistor has the low voltage level, the PMOS transistor may be turned on. For example, when the signal applied to the control electrode of the PMOS transistor has the high voltage level, the PMOS transistor may be turned off.

However, the present disclosure is not limited thereto. For example, the first to seventh transistors T1, T2, T3, T4, T5, T6, and T7 may be implemented with an n-channel metal oxide semiconductor (NMOS) transistor. A low voltage level may be the inactivation level, and a high voltage level may be the activation level. For example, when a signal applied to a control electrode of the NMOS transistor has the low voltage level, the NMOS transistor may be turned off. For example, when the signal applied to the control electrode of the NMOS transistor has the high voltage level, the NMOS transistor may be turned on. That is, the activation level and the inactivation level may be determined according to a transistor, and more particularly, a kind of transistor.

For example, in an initialization period, the gate signal SCAN[N−1] of the previous pixel row may have the activation level, and the fourth transistor T4 may be turned on. Accordingly, the first initialization voltage VINT may be applied to the first node N1. For example, the first initialization voltage VINT may be a gate initialization voltage, which may be applied to the first node N1 in a gate initialization operation. That is, the control electrode of the first transistor T1 (i.e., the storage capacitor CST) may be initialized.

For example, in a data writing and anode initialization period, the gate signal SCAN[N] may have the activation level, and the second transistor T2, the third transistor T3, and the seventh transistor T7 may be turned on. Accordingly, the data voltage VDATA may be written in the storage capacitor CST, and the second initialization voltage VAINT may be applied to the first electrode of the light emitting element EE. The second initialization voltage VAINT may be an anode initialization voltage, which may be applied to the first electrode, which may be the anode electrode of the light emitting element EE.

For example, in an emission period, the emission signal EM [N] may have the activation level, and the fifth transistor T5 and the sixth transistor T6 may be turned on. Accordingly, as the first power voltage ELVDD may be applied to the first transistor T1, a driving current may be generated, and the generated driving current may be applied to the light emitting element EE. That is, the light emitting element EE may emit light with a luminance corresponding to the driving current.

Figure 3:
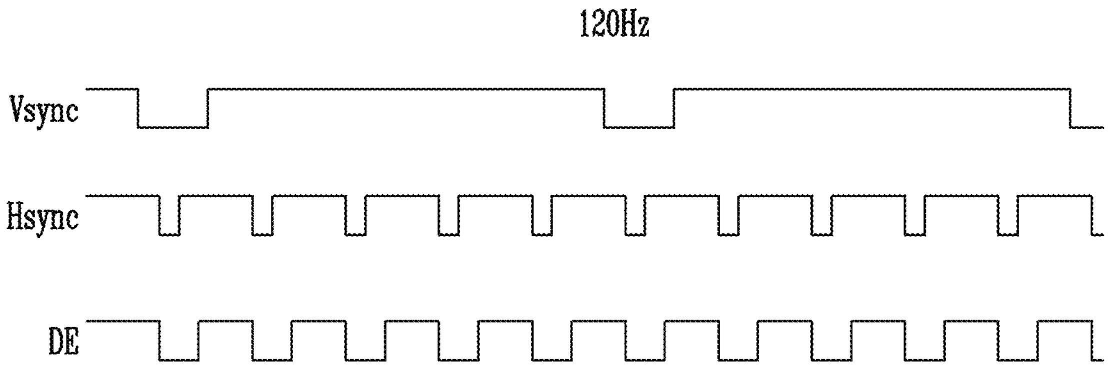
FIG. 3 is a timing diagram illustrating an example in which the display device shown in FIG. 1 operates at a driving frequency of 120 Hz.
Figure 4:
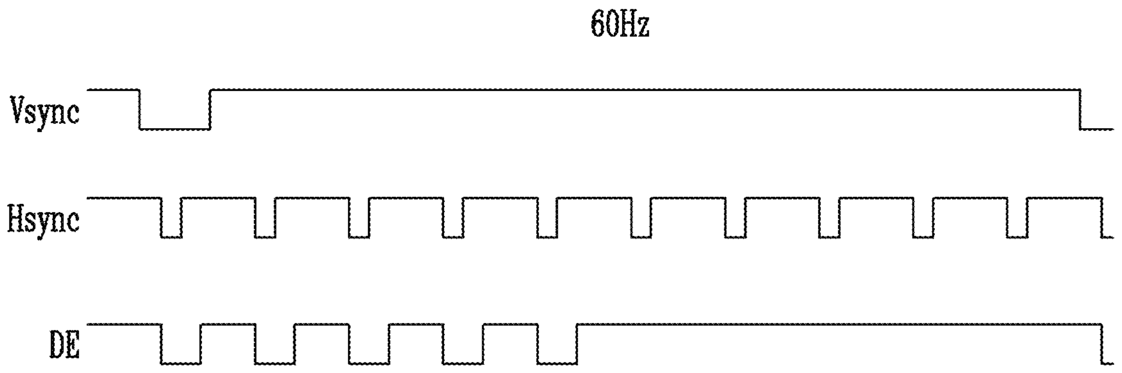
FIG. 4 is a timing diagram illustrating an example in which the display device shown in FIG. 1 operates at a driving frequency of 60 Hz.

FIG. 3 is a timing diagram illustrating an example in which the display device shown in FIG. 1 operates at a driving frequency of 120 Hz. FIG. 4 is a timing diagram illustrating an example in which the display device shown in FIG. 1 operates at a driving frequency of 60 Hz.

Referring to FIGS. 1 to 4, the input control signal CONT may include a vertical synchronization signal Vsync, a horizontal synchronization signal Hsync, and a data enable signal DE.

The vertical synchronization signal Vsync may include a plurality of pulses, and may indicate that a previous frame period is ended and a current frame period is started with respect to a time at which each of the pulses is generated. An interval between adjacent pulses of the vertical synchronization signal Vsync may correspond to a frame. The horizontal synchronization signal Hsync may include a plurality of pulses, and indicate that a previous horizontal period is ended and a new horizontal period is started with respect to a time at which each of the pulses is generated. The data enable signal DE may indicate that input image data IMG is supplied in a horizontal period. The input image data IMG may be supplied in the form of a data voltage VDATA in a pixel row unit in horizontal periods, corresponding to the data enable signal DE.

As shown in FIG. 4, as the driving frequency becomes low, the length of one frame may be lengthened. In addition, the data enable signal DE may not have any pulses in a period in which the length of a frame is lengthened. In the period in which the data enable signal DE does not have any pulses, the data voltage VDATA may not be written. For example, the period in which the data enable signal DE does not have any pulses may be called an idle period, and the data voltage VDATA may not be written. While the data voltage VDATA is not written, a volage stored in the storage capacitor CST may be leaked. For example, while the data voltage VDATA is not written, a volage stored in the storage capacitor CST may be leaked through the third transistor T3 and the fourth transistor T4. That is, when the dame data voltage VDATA is written even at different driving frequencies, a luminance difference may be caused due to the leaked voltage. In addition, the leaked voltage stored in the storage capacitor CST may vary while the data voltage VDATA is not written for each area of the display panel 100, even at the same driving frequency. That is, when the same data voltage VDATA is written even at the same driving frequency, a luminance difference may be caused for different areas of the display panel 100 due to the leaked voltage. The driving controller 200 may calculate a correction value V0_offset for each area of the display panel 100 according to a driving frequency. Also, the driving controller 200 may determine a black data voltage V0 by adding the calculated correction value V0_offset for each area of the display panel 100 to a black data set voltage V0_SET, so that the luminance difference can be reduced or minimized. In embodiments, the driving controller 200 may calculate the correction value V0_offset for each area of the display panel 100 by additionally considering a temperature and a dimming level of the display panel 100 in addition to the driving frequency. Also, the driving controller 200 may determine the black data voltage V0 by adding the calculated correction value V0_offset for each area of the display panel 100 to the black data set voltage V0_SET, so that the luminance difference can be reduced or minimized.

Figure 5:
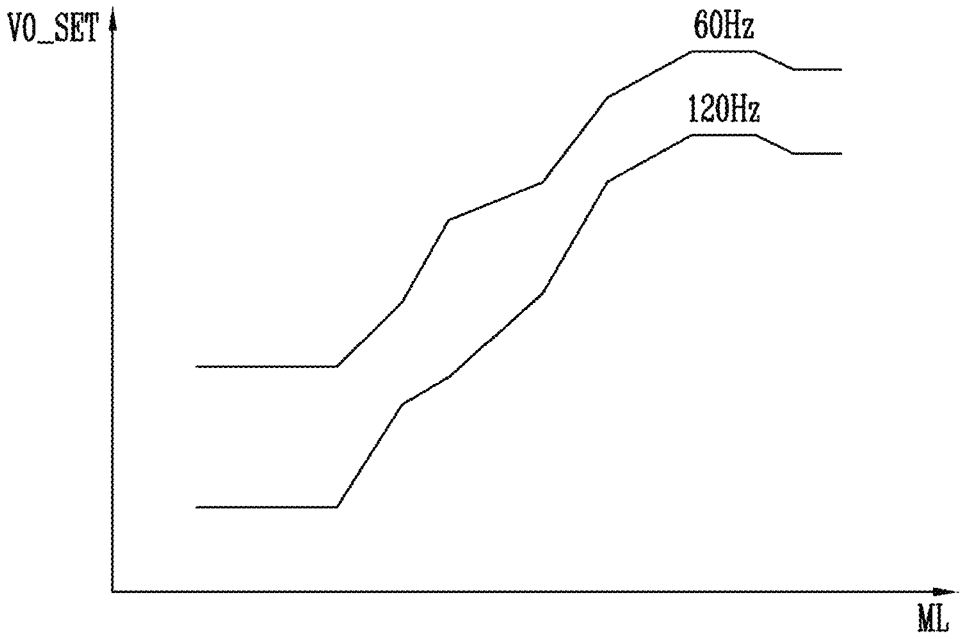
FIG. 5 is a graph illustrating an example in which the display device shown in FIG. 1 determines black data set voltage according to driving frequency.

FIG. 5 is a graph illustrating an example in which the display device shown in FIG. 1 determines black data set voltage according to driving frequency.

Referring to FIG. 1 and FIG. 5, the driving controller 200 may determine a black data voltage V0 by adding a correction value V0_offset for each area of the display panel 100 to a black data set voltage V0_SET. The black data set voltage V0_SET may be a voltage set in the driving controller 200 by the user.

The black data voltage V0 may be a high (e.g., maximum) value among data voltages. For example, as shown in FIG. 2, the driving transistor may be implemented with the PMOS transistor. Accordingly, as a gate voltage of the driving transistor is increased, the driving current may be decreased. Accordingly, the data voltage at the black grayscale (i.e., the grayscale 0) may have a high (e.g., maximum) value.

In an embodiment, in a partial period of a high dimming level ML, the black data set voltage V0_SET may become higher as the dimming level ML becomes smaller. In an embodiment, the black data set voltage V0_SET may be constant regardless of the dimming level ML in a partial period of a low dimming level ML.

The black data set voltage V0_SET may be decreased as the dimming level becomes smaller, so that the data range of a data voltage in the low dimming level ML can be reduced. In addition, as the data range of the data voltage is reduced, instantaneous afterimages or ghost images caused by a hysteresis characteristic of the driving transistor, which may be exhibited at a low luminance (e.g., a low dimming level ML), can be reduced or minimized. However, embodiments of the present disclosure are not necessarily limited thereto, and the black data set voltage V0_SET may be set to an arbitrary value. For example, the black data set voltage V0_SET may be differently set for different areas of the display panel 100. For example, the black data set voltage V0_SET may be equally set for each area of the display panel 100. For example, the black data set voltage V0_SET may be differently set in the first to third sub-pixels of each of the sub-pixels SP of the display panel 100. For example, the black data set voltage V0_SET may be equally set in the first to third sub-pixels of each of the sub-pixels SP of the display panel 100.

Figure 6:
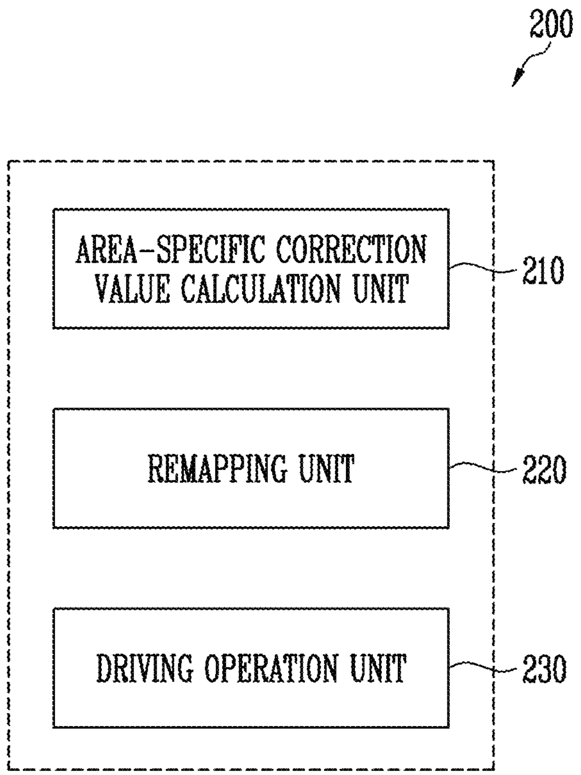
FIG. 6 is a block diagram illustrating a driving controller shown in FIG. 1 in accordance with embodiments of the present disclosure.

FIG. 6 is a block diagram illustrating the driving controller shown in FIG. 1.

Referring to FIG. 1 and FIG. 6, the driving controller 200 may include an area-specific correction value calculation unit 210, a remapping unit 220, and a driving operation unit 230. The driving controller 200 may further include other components in addition to the area-specific correction value calculation unit 210, the remapping unit 220, and the driving operation unit 230. However, for convenience of description, only some components may be illustrated in FIG. 6.

In embodiments of the present disclosure, the memory storage 800 may include luminance-specific black data voltage information on a reference area. For example, the reference area may be a central area of the display panel 100. Similarly, the memory storage 800 may include luminance-specific black data voltage information calculated for other areas (e.g., areas except the central area of the display panel 100). The luminance-specific black data voltage information for the other areas may be calculated as an area-specific weighted value with respect to the reference area (e.g., the central area of the display area DA). For example, a value of the reference area may be multiplied by area-specific weights to obtain the luminance-specific black data voltage information for each of the other areas. The black data voltage information stored in the memory storage 800 may be stored in the memory storage 800 in accordance with a command received from the user in a processing process.

In embodiments, the black data voltage information may be information for displaying a black image with a target luminance, corresponding to a variable driving frequency (e.g., a driving frequency of the display panel 100), a variable dimming level, and/or a variable temperature (e.g., a temperature of the display panel 100).

The area-specific correction value calculation unit 210 may acquire information on a black data voltage from the memory storage 800.

Also, the area-specific correction value calculation unit 210 may calculate an area-specific correction value V0_offset (see FIG. 16) for displaying a black image with a target luminance under a set driving frequency, a set dimming level, and/or a set temperature, based on the acquired information.

Also, the area-specific correction value calculation unit 210 may obtain an area-specific black data voltage V0 value by adding the area-specific correction value V0_offset (see FIG. 16) to a black data set voltage V0_SET. The black data set voltage V0_SET may be a value input to the driving controller 200 by the user.

The remapping unit 220 may transfer information on the calculated black data voltage (V0) value for an area to the data driver 400, allowing the data driver 400 to re-set, for the area, a correspondence relationship between the data voltages V0 to V255 of the grayscales 0 to 255 and the gamma reference voltage VGREF. More particularly, the remapping unit 220 may transfer information on the calculated black data voltage (V0) value for each area to the data driver 400, allowing the data driver 400 to re-set, for each area, a correspondence relationship between the data voltages V0 to V255 of the grayscales 0 to 255 and the gamma reference voltage VGREF. In other words, by the remapping unit 220, the data driver 400 may remap, for each area, the relationship between the gamma reference voltage VGREF and the data voltages V0 to V255 of the grayscales 0 to 255. Accordingly, in order to display a black image of the same grayscale, magnitudes of data voltages to be supplied for each area of the display panel 100 may be different from, or equal to each other. The data driver 400 may supply data voltages for each area of the display panel 100, using the gamma reference voltage VGREF, to display a black image with a target luminance.

The driving operation unit 230 may control the driving voltage generator 600 and the power supply 700 when a black image with a target luminance cannot be displayed for each area through only remapping in the data driver 400.

For example, the driving operation unit 230 may calculate a correction value VGH_offset for the gate high voltage VGH from the area-specific correction value V0_offset calculated by the area-specific correction value calculation unit 210. Also, the driving operation unit 230 may control the driving voltage generator 600 to supply an adjusted gate high voltage VGH' by adding the correction value VGH_offset for the gate high voltage VGH to the existing gate high voltage VGH. For example, the gate high voltage VGH may be adjusted using the correction value VGH_offset for the gate high voltage VGH.

For example, the driving operation unit 230 may calculate a correction value VLIN1_offset for the source voltage VLIN1 from the calculated correction value VGH_offset for the gate high voltage VGH. Also, the driving operation unit 230 may control the power supply 700 to supply an adjusted source voltage VLIN1' by adding the correction value VLIN1_offset for the source voltage VLIN1 to the existing source voltage VLIN1. For example, the source voltage VLIN1 may be adjusted using the correction value VLIN1_offset for the source voltage VLIN1.

The display device DD in accordance with example embodiments of the present disclosure may set, for each area of the display panel 100, a black data voltage a driving frequency, a dimming level, and/or a temperature. To this end, the display device DD may remap, for each area of the display panel 100, a relationship between the gamma reference voltage VGREF and data voltages in the data driver 400 according to a variable driving frequency, a various dimming level, and/or a variable temperature. Accordingly, the display device DD can reduce or prevent a luminance difference from occurring between areas of the display panel 100 in a black image displayed on the display panel 100.

Figure 7:
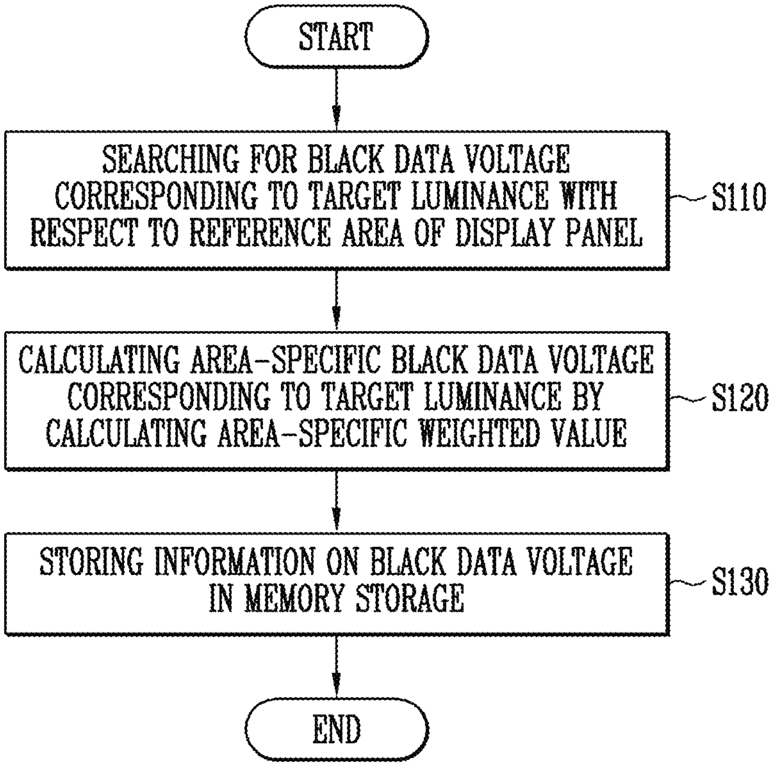
FIG. 7 is a flowchart illustrating a manufacturing method of the display device shown in FIG. 1 in accordance with embodiments of the present disclosure.

FIG. 7 is a flowchart illustrating a manufacturing method of the display device shown in FIG. 1.

Referring to FIGS. 1 to 7, in step S110, a user, a mechanical device, or the like may search for a black data voltage V0 corresponding to a target luminance with respect to a reference area of the display panel 100. This will be described in detail with reference to FIG. 8.

In step S120, the user, the mechanical device, or the like may calculate an area-specific black data voltage V0 corresponding to the target luminance by calculating an area-specific weighted value of the other areas with respect to the reference area of the display panel 100. This will be described in detail with reference to FIG. 9.

In step S130, the user, the mechanical device, or the like may store, in the memory storage 800, information on the black data voltage V0 corresponding to the target luminance for each area of the display panel 100.

Figure 8:
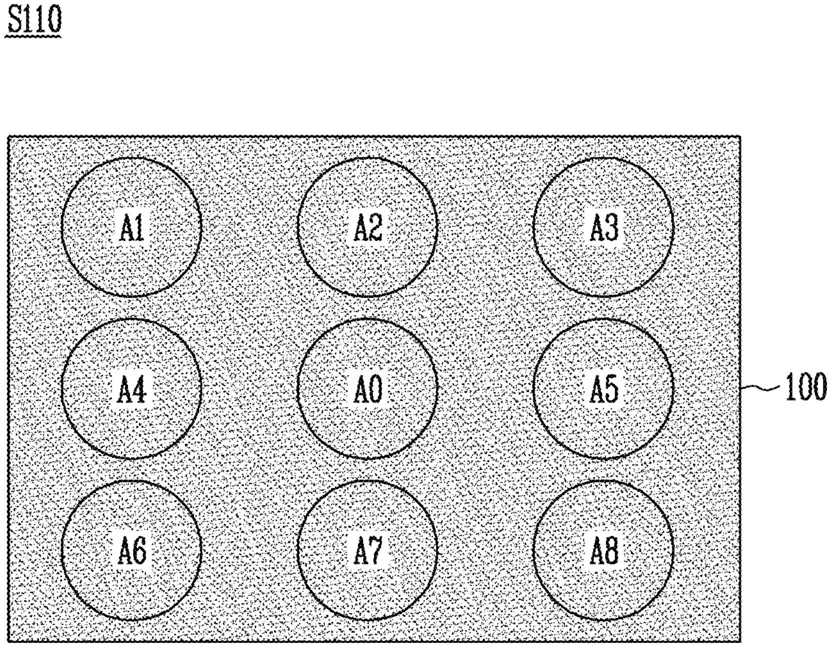
FIG. 8 is a diagram illustrating step S110 shown in FIG. 7.

FIG. 8 is a diagram illustrating the step S110 shown in FIG. 7.

Referring to FIG. 8, the display panel 100 may be divided into a plurality of areas. As shown in FIG. 8, the display panel 100 may be divided into first to eighth areas A0 to A8. A zeroth area A0 may correspond to a central area of the display panel 100. However, embodiments of the present disclosure are not necessarily limited thereto. For example, the display panel 100 may be divided into a number of areas less than or greater than nine areas. For example, the display panel 100 may be divided into fewer than nine areas. However, hereinafter, for convenience of description, it is assumed that the display panel 100 is divided into the nine areas. Furthermore, the zeroth area A0 may correspond to an area other than a central area of the display panel 100.

The zeroth area A0 of the display area DA may be the reference area of the display panel 100. The user, the mechanical device, or the like may search for a black data voltage V0 at which the zeroth area A0 of the display panel 100 displays a black image of the target luminance in the condition of a set dimming level, a set temperature, and a set driving frequency. For example, an arbitrary data voltage may be supplied to the zeroth area A0 of the display panel 100, and a luminance an image displayed in the zeroth area A0 of the display panel 100 may be measured through a luminance measuring apparatus. In addition, the arbitrary data voltage may be corrected such that the measured luminance becomes the target luminance, and the black data voltage V0 may be detected.

In this manner, black data voltages V0 corresponding to a plurality of luminances with respect to the zeroth area A0 of the display panel 100 may be searched in the condition of the set dimming level, the set temperature, and the set driving frequency.

Figure 9:
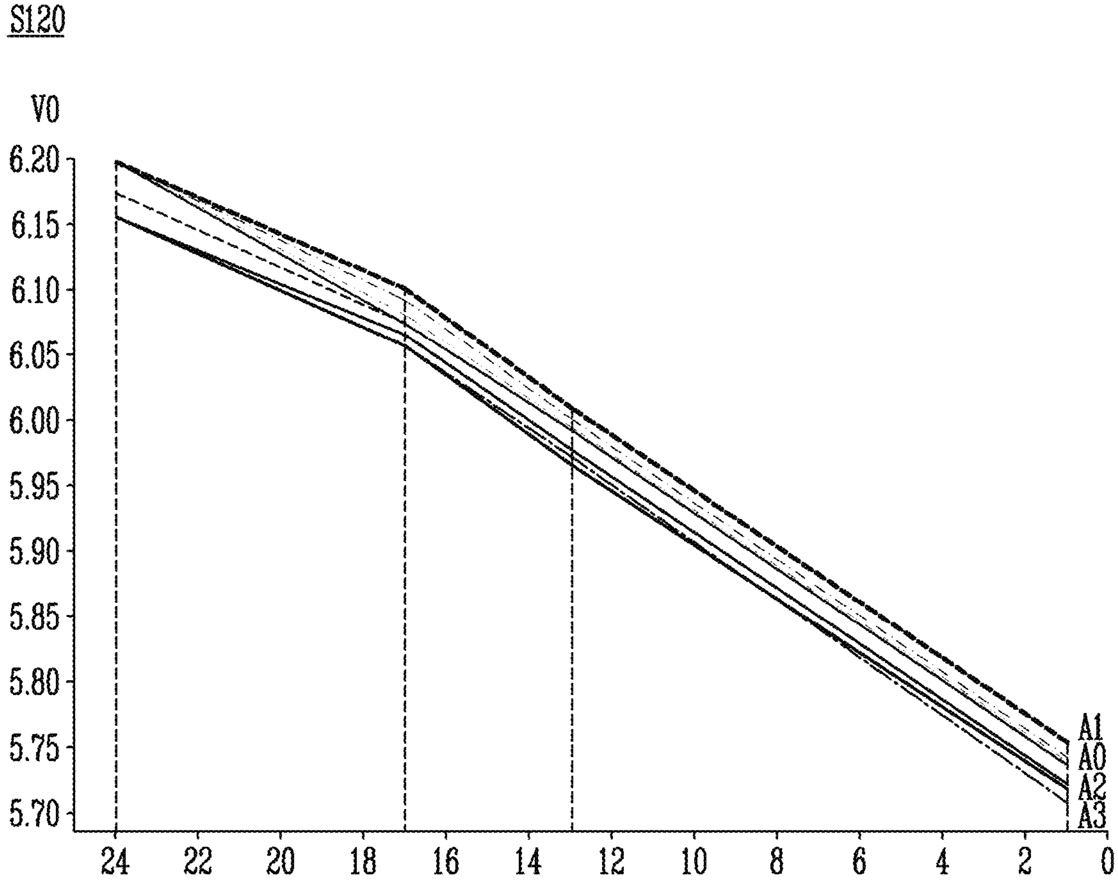
FIG. 9 is a diagram illustrating step S120 shown in FIG. 7.

FIG. 9 is a diagram illustrating the step S120 shown in FIG. 7. In FIG. 9, for convenience of description, only the zeroth to third areas A0 to A3 will be described as an example. However, the other areas may be performed similar to the zeroth to third areas A0 to A3.

Referring to FIG. 9, values of the horizontal axis represent luminances. In addition, values of the vertical axis represent black data voltage (V0) values corresponding to luminances for each area of the display panel 100.

A plot may be depicted as shown in the graph of FIG. 9, using black data voltage (V0) values corresponding to a plurality of luminances for the zeroth area of the display panel 100, which may be measured in the step S110.

Also, in the step S120, black data voltage (V0) values corresponding to some luminances among the plurality of luminances may be searched for each area in the condition of the set dimming level, the set temperature, and the set driving frequency. For example, as shown in FIG. 9, area-specific black data voltage (V0) values respectively corresponding to luminances of 0 Nit, 7 Nit, 11 Nit, and 23 Nit may be first searched. In some cases, black data voltage (V0) values corresponding to some luminances may be searched for each area under several conditions by varying the dimming level, the temperature, and the driving frequency.

Plots may be depicted as shown in the graph of FIG. 9, using the black data voltage (V0) values searched for each area. An area-specific weighted value may be calculated with respect to the reference area (or the zeroth area A0) through the depicted graphs. A plot for a black data voltage V0 of the first area A1 may be generally similar to the plot for the black data voltage V0 of the zeroth area A0. Accordingly, a weighted value of the first area A1 may be close to 1. A plot for a black data voltage V0 of the third area A3 is located below the plot for the black data voltage V0 of the zeroth area A0. Accordingly, a weighted value of the third area A3 may be a number between 0 and 1. In FIG. 9, the plot for the black data voltage V0 of the first area A1 is located above the plot for the black data voltage V0 of the zeroth area A0. Accordingly, a weighted value of the first area A1 may be 1 or more.

Black data voltage (V0) values corresponding to a specific luminance with respect to the first to third areas A1 to A3 may be calculated using the above-described calculated area-specific weighted value, without being directly measured.

Information on black data voltages V0 measured or calculated in relation to the zeroth to third areas A0 to A3 under the condition of several dimming levels, several temperatures, and several driving frequencies may be stored in the memory storage 180.

Figure 10:
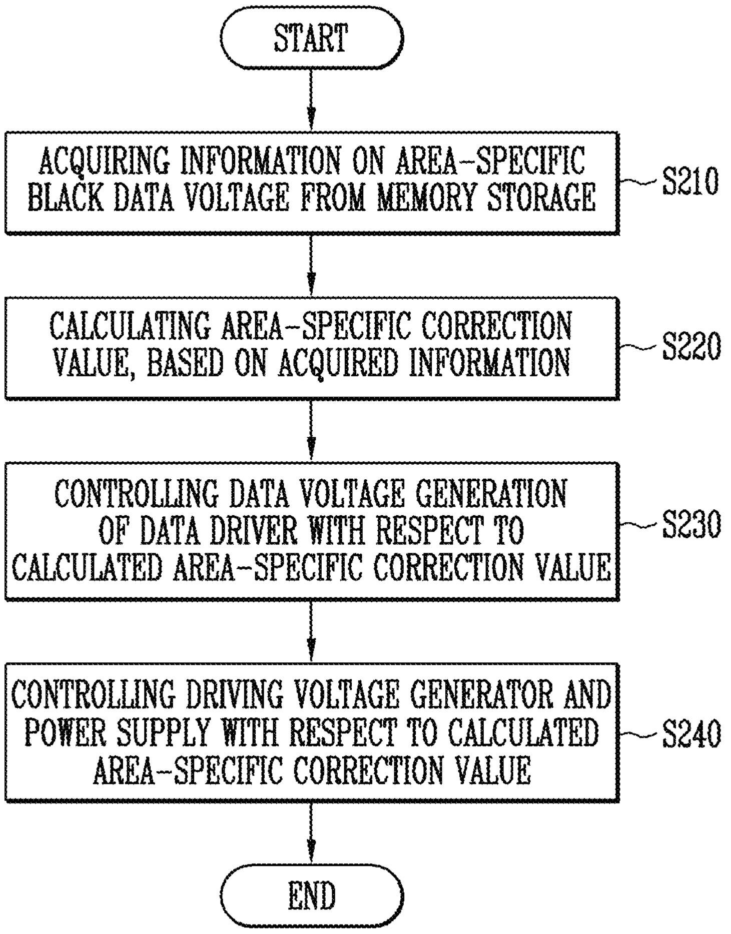
FIG. 10 is a flowchart illustrating a driving method of the display device shown in FIG. 1 in accordance with embodiments of the present disclosure.

FIG. 10 is a flowchart illustrating a driving method of the display device shown in FIG. 1.

Referring to FIG. 10, in step S210, the driving controller 200 may acquire information on an area-specific black data voltage V0 from the memory storage 800. This will be described with reference to FIG. 11.

In step S220, the driving controller 200 may calculate an area-specific correction value V0_offset of the display panel 100, based on the acquired information. This will be described with reference to FIGS. 12 to 15.

In step S230, the driving controller 200 may calculate an area-specific black data voltage (V0) value, using the calculated area-specific correction value V0_offset. Also, the driving controller 200 may transfer information on the calculated area-specific black data voltage (V0) value to the data driver 400, and a data voltage generation of the data driver 400 may be controlled. This will be described with reference to FIG. 16.

The driving controller 200 may control the driving voltage generator 600 and the power supply 700, using the area-specific correction value V0_offset. This will be described with reference to FIG. 17 and FIG. 18.

Figure 11:
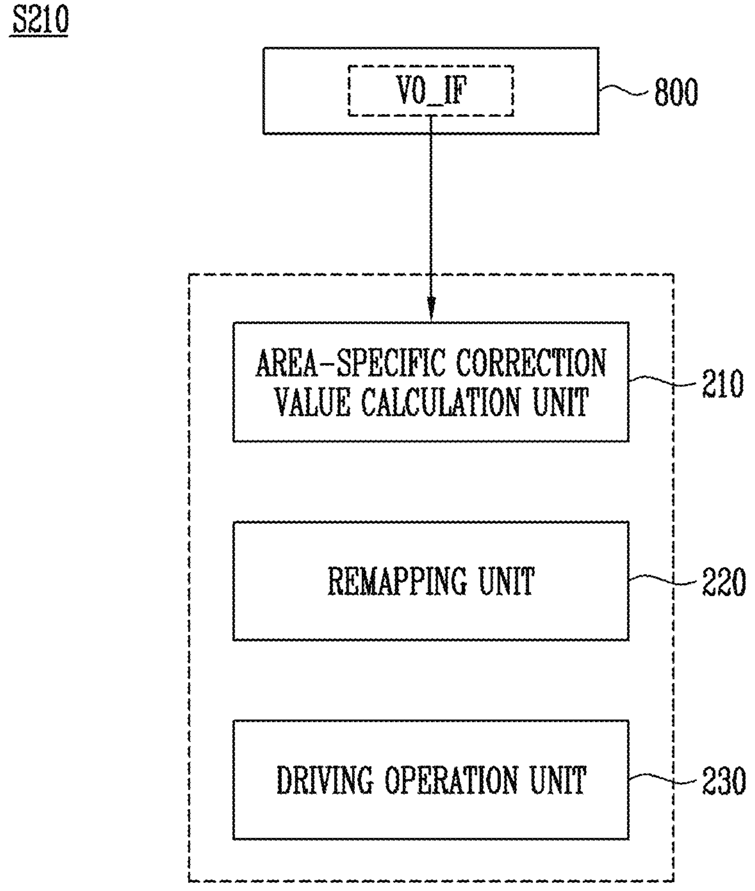
FIG. 11 is a diagram illustrating step S210 shown in FIG. 10.

FIG. 11 is a diagram illustrating the step S210 shown in FIG. 10.

Referring to FIGS. 1 to 11, in embodiments of the present disclosure, the memory storage 800 may include luminance-specific black data voltage information V0_IF on a reference area (e.g., a central area of the display panel 100). Similarly, the memory storage 800 may include luminance-specific black data voltage information V0_IF calculated for other areas (e.g., areas except the central area of the display panel 100). The luminance-specific black data voltage information V0_IF may be calculated as an area-specific weighted value with respect to the reference area (e.g., the central area of the display panel 100). For example, a value of the reference area may be multiplied by area-specific weights to obtain the luminance-specific black data voltage information for each of the other areas. The black data voltage information V0_IF may be stored in the memory storage 800. For example, the black data voltage information V0_IF may be stored in the memory storage 800 in accordance with a command received from the user in a processing process.

In embodiments, the black data voltage information V0_IF may be information for displaying a black image with a target luminance, corresponding to a variable driving frequency (e.g., a driving frequency of the display panel 100), a variable dimming level, and/or a variable temperature (e.g., a temperature of the display panel 100).

The area-specific correction value calculation unit 210 may acquire the black data voltage information V0_IF from the memory storage 800.

FIGS. 12 to 15 are diagrams illustrating the step S220 shown in FIG. 10. For convenience of description, only the zeroth area A0 and the first area A1 will be described as an example. However, the other areas may be performed similarly to the zeroth area A0 and the first area A1.

Figure 12:
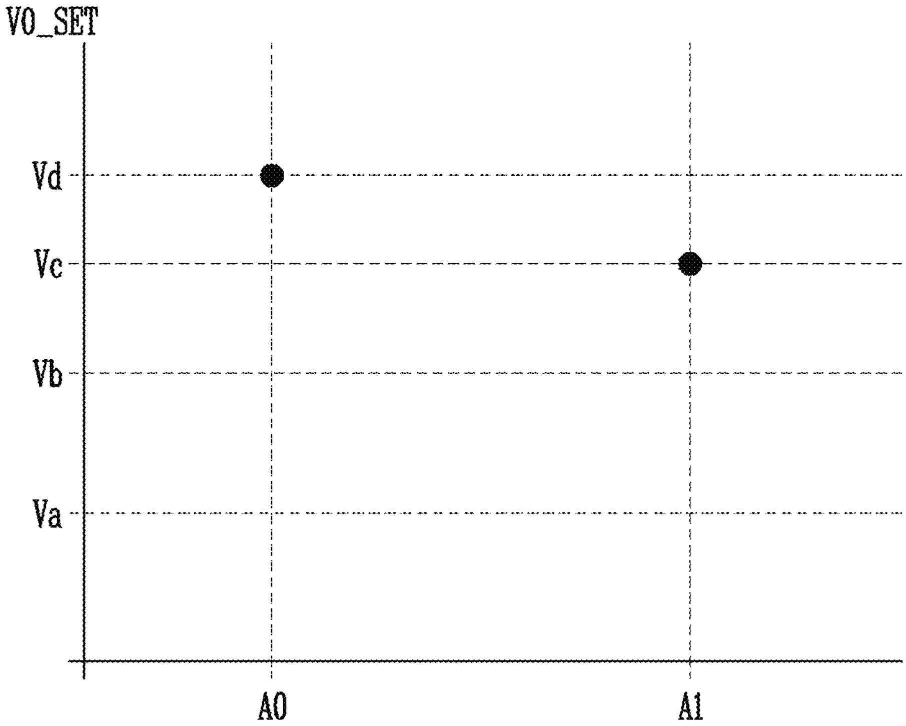
FIGS. 12 to 15 are diagrams illustrating step S220 shown in FIG. 10.
Figure 13:
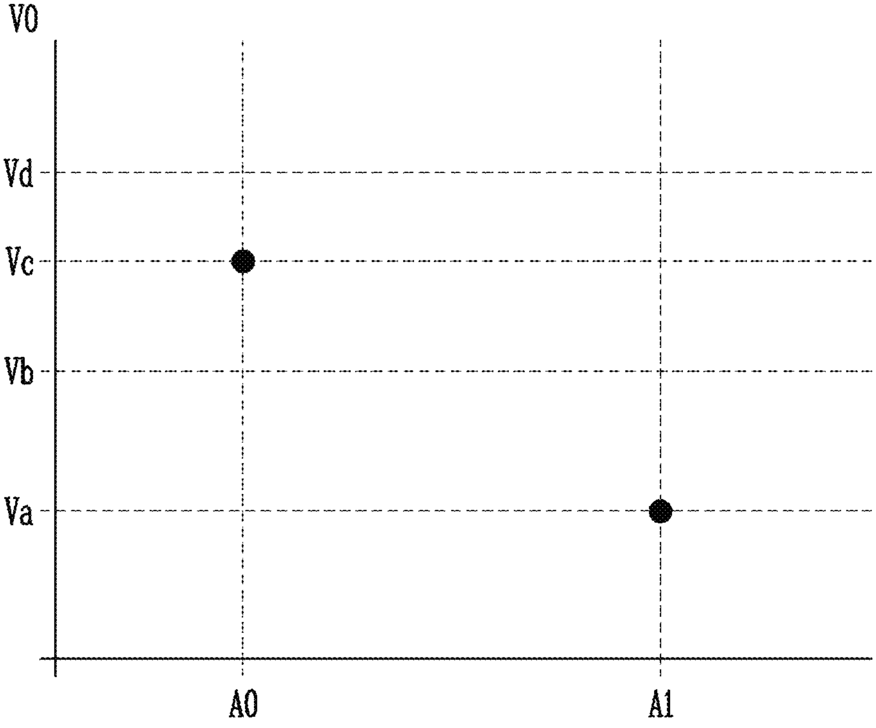

Referring to FIG. 1, FIG. 12, and FIG. 13, a black data set voltage V0_SET may vary for different areas of the display panel 100. For example, a black data set voltage V0_SET in the zeroth area A0 may be Vd, and a black data set voltage V0_SET in the first area A1 may be Vc. However, embodiments of the present disclosure are not necessarily limited thereto, and the black data set voltage V0_SET may be the same for each area of the display panel 100.

Based on the information acquired from the memory storage 800, an area-specific correction value V0_offset to be added to the black data set voltage V0_SET may be calculated such that each area of the display panel 100 displays a black image with a specific luminance under the condition of a set dimming level, a set temperature, and a set driving frequency. For example, referring to FIG. 13, since the black data voltage V0 is to be Vc to display a black image with a specific luminance in the zeroth area A0, a correction value in the zeroth area A0 may be Vc to Vd. For example, referring to FIG. 13, since the black data voltage V0 is to be Va to display the black image with the specific luminance in the first area A1, a correction value in the first area A1 may be Va, Vb, and Vc.

Figure 14:
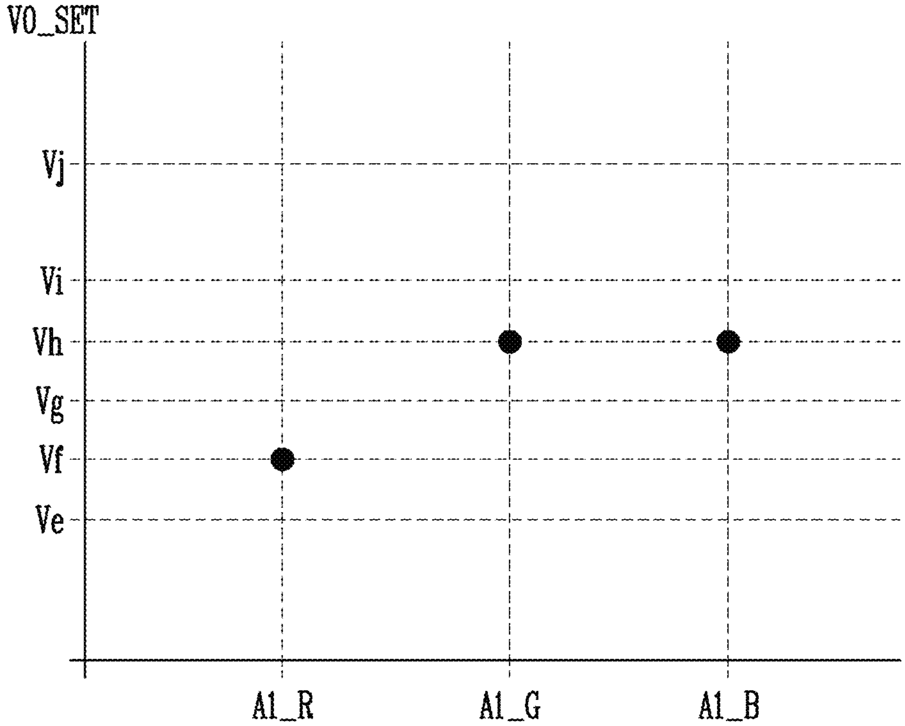
Figure 15:
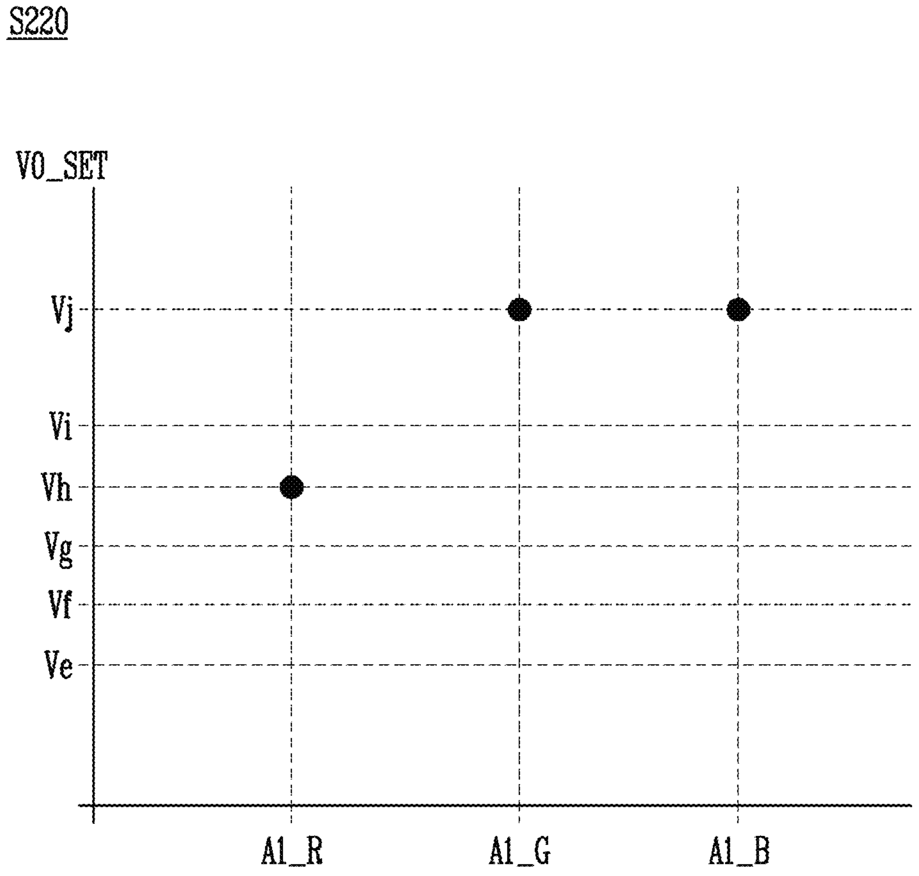

FIG. 14 and FIG. 15 are different from FIG. 12 and FIG. 13, in that black data set voltages V0_SET for first to third sub-pixels of each of the sub-pixels SP may be individually set, and area-specific correction values V0_offset for the first to third sub-pixels may be individually calculated. As for the other portions, FIG. 14 and FIG. 15 may be substantially the same as FIG. 12 and FIG. 13.

Here, the first area A1 will be described as an example. The other areas may be substantially the same. A first sub-pixel A1_R of each of sub-pixels SP included in the first area A1 may be a sub-pixel emitting red light. A second sub-pixel A1_G of each of the sub-pixels SP included in the first area A1 may be a sub-pixel emitting green light. A third sub-pixel A1_B of each of the sub-pixels SP included in the first area A1 may be a sub-pixel emitting blue light.

Black data set voltages V0_SET of the first to third sub-pixels A1_R, A1_G, and A1_B may be equally set. However, embodiments are not necessarily limited thereto. For example, as shown in FIG. 14, the black data set voltages V0_SET of the first to third sub-pixels A1_R, A1_G, and A1_B may be set different from one another. Hereinafter, it is assumed and described that the black data set voltages V0_SET of the first to third sub-pixels A1_R, A1_G, and A1_B may be set different from one another.

A black data set voltage V0_SET of the first sub-pixel A1_R of each of the sub-pixels included in the first area A1 may be Vf, a black data set voltage V0_SET of the second sub-pixel A1_G of each of the sub-pixels included in the first area A1 may be Vh, and a black data set voltage V0_SET of the third sub-pixel A1_B of each of the sub-pixels included in the first area A1 may be Vh.

Based on the information acquired from the memory storage 800, an area-specific correction value V0_offset to be added to the black data set voltage V0_SET may be calculated such that each area of the display panel 100 displays a black image with a specific luminance under the condition of a set dimming level, a set temperature, and a set driving frequency. For example, referring to FIG. 15, since the black data voltage V0 of the first sub-pixel A1_R of each of the sub-pixels SP included in the first area is to be Vh to display a black image with a specific luminance in the first area A1, a correction value in the first area A1 may be Vh to Vf. For example, referring to FIG. 15, since the black data voltage V0 of the second sub-pixel A1_G of each of the sub-pixels SP included in the first area is to be Vj to display a black image with a specific luminance in the first area A1, a correction value in the first area A1 may be Vj to Vh. For example, referring to FIG. 15, since the black data voltage V0 of the third sub-pixel A1_B of each of the sub-pixels SP included in the first area is to be Vj to display a black image with a specific luminance in the first area A1, a correction value in the first area A1 may be Vj to Vh.

Figure 16:
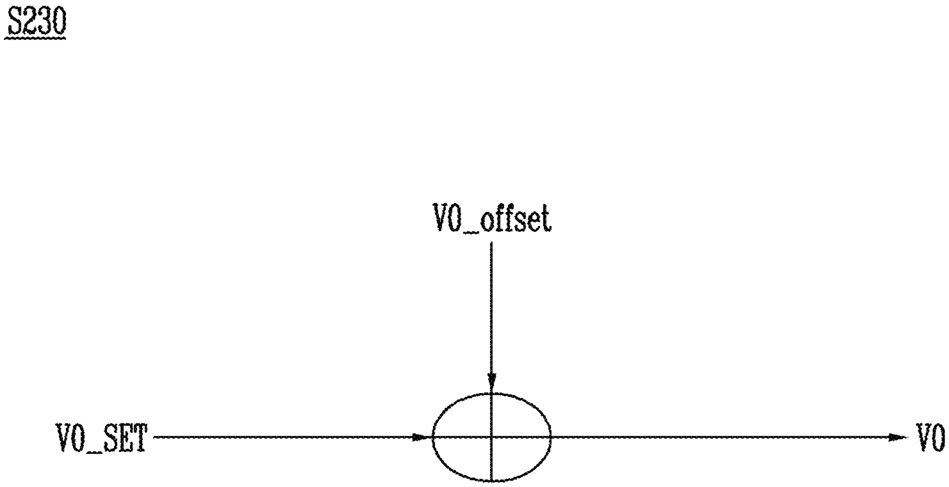
FIG. 16 is a diagram illustrating step S230 shown in FIG. 10.

FIG. 16 is a diagram illustrating the step S230 shown in FIG. 10.

Figure 17:
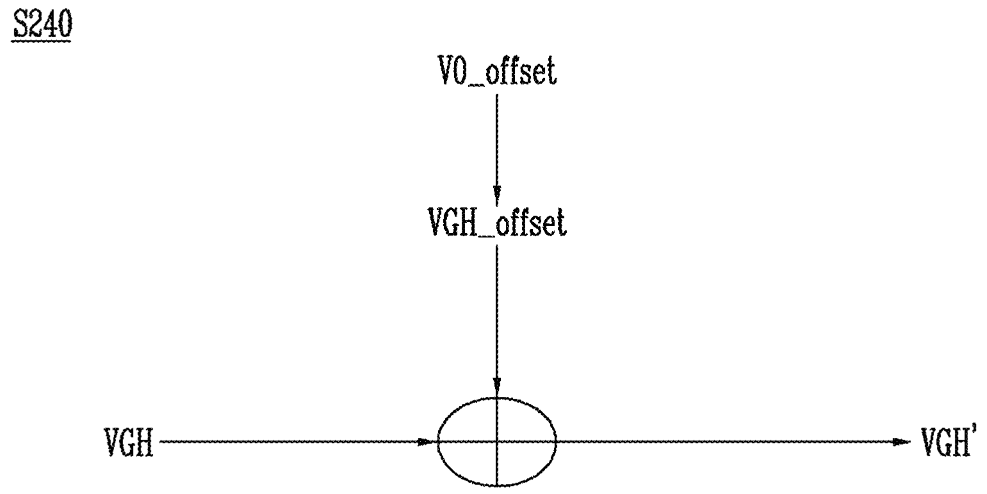
FIG. 17 and FIG. 18 are diagrams illustrating step S240 shown in FIG. 10.
Figure 18:
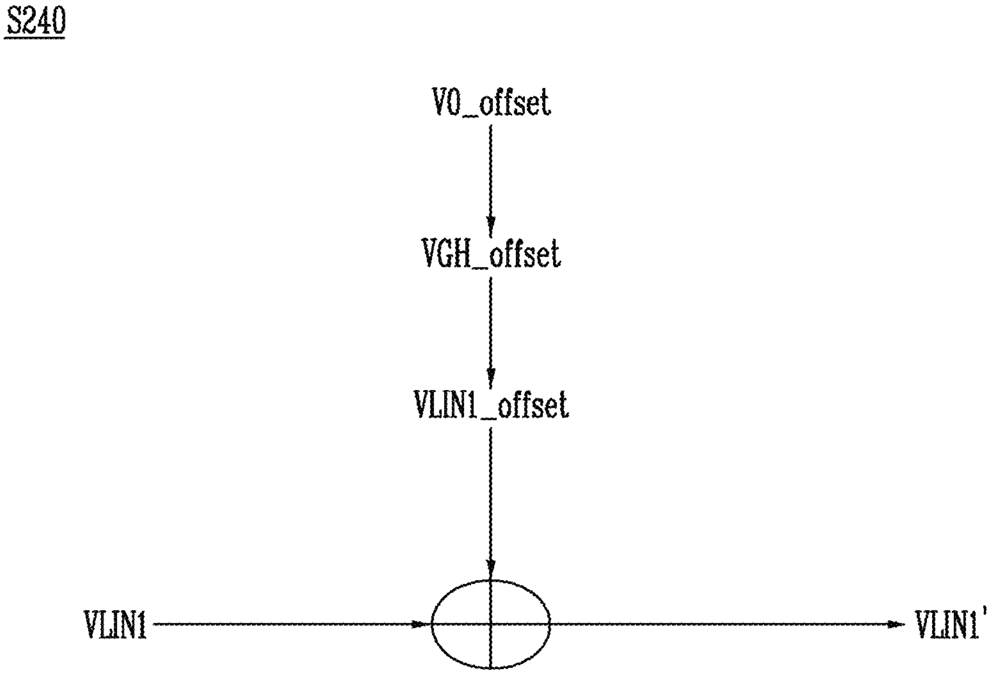

Referring to FIG. 1, FIG. 10, and FIG. 16, the driving controller 200 may calculate a black data voltage (V0) value by adding an area-specific correction value V0_offset to the black data set value V0_SET. The driving controller 200 may transfer information on the calculated area-specific black data voltage (V0) value to the data driver 400, allowing the data driver 400 to re-set, for at least one area, a correspondence relationship between the data voltages V0 to V255 of the grayscales 0 to 255 and the gamma reference voltage VGREF. For example, the data driver 400 may re-set, for each area, a correspondence relationship between the data voltages V0 to V255 of the grayscales 0 to 255 and the gamma reference voltage VGREF. In other words, by the driving controller 200, the data driver 400 may remap, for each area, the relationship between the gamma reference voltage VGREF and the data voltages V0 to V255 of the grayscales 0 to 255. Accordingly, in order to display a black image of the same grayscale, magnitudes of data voltages to be supplied for each area of the display panel 100 may be different from or equal to each other. The data driver 400 may supply data voltages for at least one area of the display panel 100, using the gamma reference voltage VGREF, to display a black image with a target luminance. FIG. 17 and FIG. 18 are diagrams illustrating the step S240 shown in FIG. 10.

Referring to FIG. 1, FIG. 17, and FIG. 18, the driving controller 200 the driving controller 200 may control the driving voltage generator 600 and the power supply 700 when a black image with a target luminance cannot be displayed for each area through only remapping in the data driver 400.

For example, the driving controller 200 may calculate a correction value VGH_offset for the gate high voltage VGH from the calculated area-specific correction value V0_offset. Also, the driving controller 200 may control the driving voltage generator 600 to supply an adjusted gate high voltage VGH' by adding the correction value VGH_offset for the gate high voltage VGH to the existing gate high voltage VGH. For example, the gate high voltage VGH may be adjusted using the correction value VGH_offset for the gate high voltage VGH.

For example, the driving controller 200 may calculate a correction value VLIN1_offset for the source voltage VLIN1 from the calculated correction value VGH_offset for the gate high voltage VGH. Also, the driving controller 200 may control the power supply 700 to supply an adjusted source voltage VLIN1' by adding the correction value VLIN1_offset for the source voltage VLIN1 to the existing source voltage VLIN1. For example, the source voltage VLIN1 may be adjusted using the correction value VLIN1_offset for the source voltage VLIN1.

The display device DD in accordance with example embodiments of the present disclosure may set, for at least one area of the display panel 100, a black data voltage a driving frequency, a dimming level, and/or a temperature. The display device DD may set, for each area of the display panel 100, a black data voltage a driving frequency, a dimming level, and/or a temperature. To this end, the display device DD may remap, for at least one area of the display panel 100, a relationship between the gamma reference voltage VGREF and data voltages in the data driver 400 according to a variable driving frequency, a various dimming level, and/or a variable temperature. The display device DD may remap, for each area of the display panel 100, a relationship between the gamma reference voltage VGREF and data voltages in the data driver 400 according to a variable driving frequency, a various dimming level, and/or a variable temperature. Accordingly, the display device DD can reduce or prevent a luminance difference from occurring for one or more areas of the display panel 100 in a black image displayed on the display panel 100.

Figure 19:
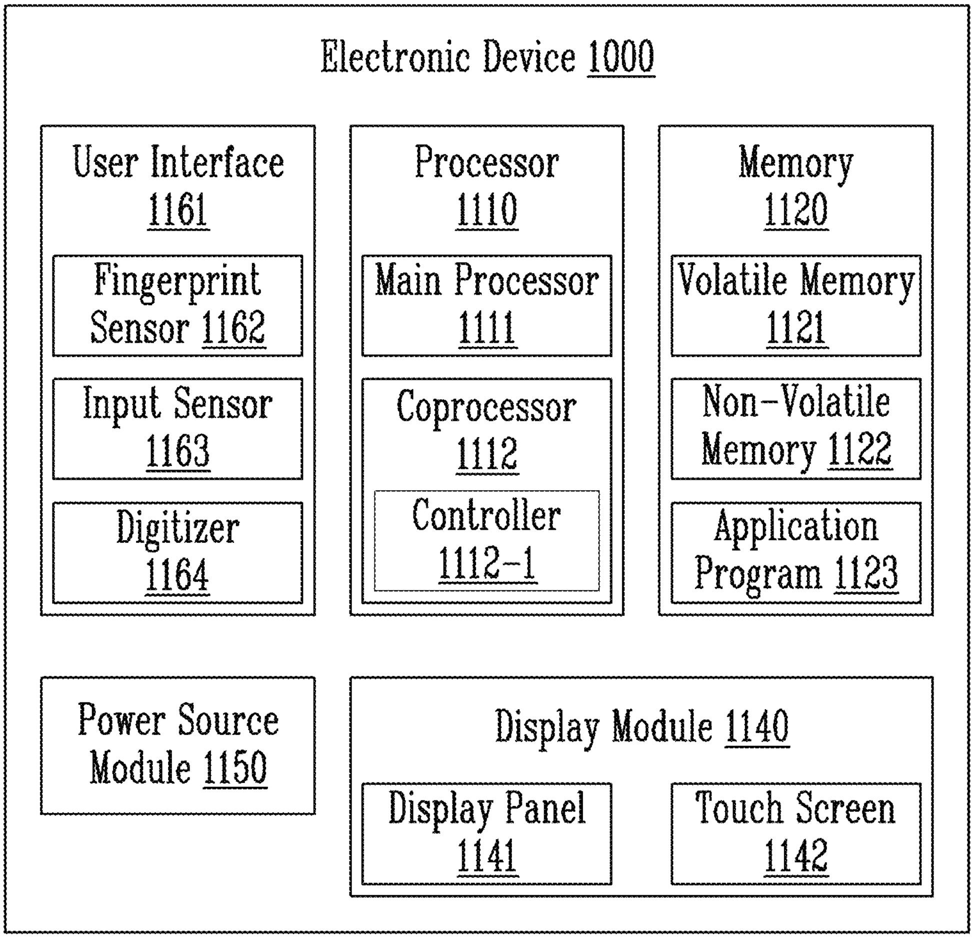
FIG. 19 is a block diagram illustrating an electronic device in accordance with embodiments of the present disclosure in accordance with embodiments of the present disclosure.
Figure 20:
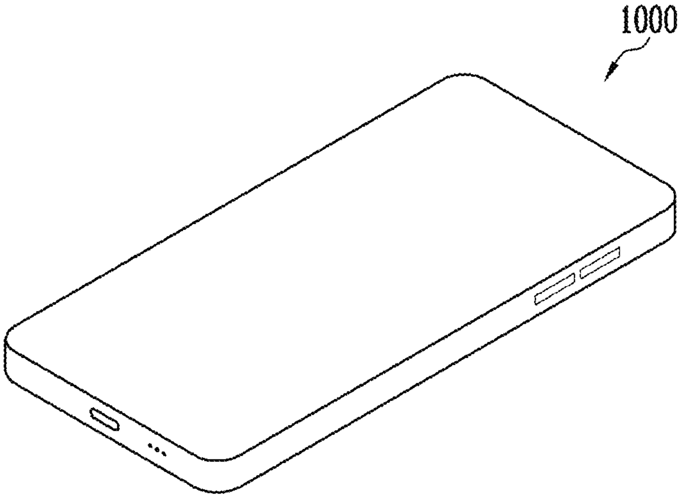
FIG. 20 is a view illustrating an example in which the electronic device shown in FIG. 19 is implemented as a smartphone.

FIG. 19 is a block diagram illustrating an electronic device in accordance with embodiments of the present disclosure. FIG. 20 is a view illustrating an example in which the electronic device shown in FIG. 19 is implemented as a smartphone.

Referring to FIG. 19 and FIG. 20, the electronic device 1000 according to one embodiment of the present invention may output various information (e.g., images, text, music, etc.) through a display module 1140, which, for example, may correspond to the display device DD shown in FIG. 1. When a processor 1110 executes an application stored in a memory 1120, the display module 1140 may provide application information to a user through a display panel 1141.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include a software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device DD shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display device DD shown in FIG. 1.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

In an embodiment, as shown in FIG. 20, the electronic device 1000 may be implemented as a smartphone. However, this is merely illustrative, and the electronic device 1000 is not limited thereto. For example, the electronic device 1000 may be implemented as a mobile phone, a video phone, a smart pad, a smart watch, a vehicle navigation system, a computer monitor, a notebook computer, a head mounted display device, or the like.

In the display device in accordance with the present disclosure, an area-specific correction value of the display panel may be determined according to a driving frequency, a dimming level, and/or a temperature, so that a black data voltage according to the driving frequency, the dimming level, and/or the temperature can be set.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel including sub-pixels;

a data driver configured to provide the sub-pixels with a data voltage generated using a gamma reference voltage;

a driving controller configured to control the data driver; and a memory storage configured to provide the driving controller with black data voltage information of a first area of the display panel according to a target luminance corresponding to a given driving frequency, a dimming level, and a temperature of the display panel.

2. The display device of claim 1, wherein the driving controller is configured to calculate an area-specific correction value for a second area of the display panel using the black data voltage information.

3. The display device of claim 2, wherein the driving controller is configured to control the data driver to remap a relationship between the gamma reference voltage and the data voltage for the second area, using the black data voltage information and the area-specific correction value.

4. The display device of claim 3, wherein the driving controller is configured to generate an area-specific black data voltage of the second area, using the black data voltage information and the area-specific correction value, and wherein the driving controller is configured to transfer, to the data driver, the area-specific black data voltage, causing the data driver to remap, for the second area, a relationship between the gamma reference voltage and the data voltage.

5. The display device of claim 2, wherein, when the driving frequency is changed, the driving controller recalculates the area-specific correction value using the black data voltage information and a changed value of the driving frequency, and wherein the driving controller is configured to control the data driver to remap, for the second area, a relationship between the gamma reference voltage and the data voltage, using the black data voltage information and a recalculated value of the area-specific correction value, wherein the remap reduces a difference in luminance between the first area and the second area.

6. The display device of claim 2, further comprising:

a gate driver configured to provide a gate signal to the sub-pixels;

a driving voltage generator configured to supply the gamma reference voltage to the data driver, and supply a gate high voltage to the gate driver; and a power supply configured to supply a source voltage to the driving voltage generator.

7. The display device of claim 6, wherein the driving controller is configured to calculate a correction value for the gate high voltage, using the area-specific correction value, and control the driving voltage generator to supply the gate high voltage corrected using the correction value, and wherein the driving controller is configured to calculate a correction value for the source voltage, using the correction value for the gate high voltage, and control the power supply to supply the source voltage calculated using the correction value for the source voltage.

8. The display device of claim 6, wherein the driving controller includes:

an area-specific correction value calculation unit configured to receive the black data voltage information provided from the memory storage, and calculate the area-specific correction value;

a remapping unit configured to receive the area-specific correction value transferred from the area-specific correction value calculation, and control the data driver to perform remapping; and a driving operation unit configured to control the driving voltage generator and the power supply.

9. A method of driving a display device including a data driver and a display panel including sub-pixels, the method comprising:

acquiring, from a memory storage, black data voltage information according to a target luminance corresponding to a given driving frequency, a dimming level, and a temperature for a first area of the display panel;

calculating an area-specific correction value for a second area of the display panel using the acquired black data voltage information, and controlling data voltage generation of the data driver using the area-specific correction value to vary the target luminance corresponding to the given driving frequency, the dimming level, and the temperature for the second area of the display panel.

10. The method of claim 9, wherein the controlling of the data voltage generation of the data driver includes:

generating an area-specific black data voltage for the second area using an area-specific black data set voltage and the area-specific correction value;

transferring, to the data driver, the area-specific black data information; and controlling the data driver to remap, for the second area, a relationship between a gamma reference voltage and a data voltage, using the area-specific black data voltage to reduce a difference in luminance between the first area and the second area.

11. The method of claim 10, wherein the display device further includes:

a gate driver configured to provide a gate signal to the sub-pixels;

a driving voltage generator configured to supply the gamma reference voltage to the data driver, and supply a gate high voltage to the gate driver; and a power supply configured to supply a source voltage to the driving voltage generator, and wherein the method further comprises controlling the driving voltage generator and the power supply.

12. The method of claim 11, wherein the controlling of the driving voltage generator and the power supply includes:

calculating a correction value for the gate high voltage, using the area-specific correction value, and controlling the driving voltage generator to supply the gate high voltage adjusted using the correction value for the gate high voltage; and calculating a correction value for the source voltage, using the correction value for the gate high voltage, and controlling the power supply to supply the source voltage adjusted using the correction value for the source voltage.

13. The method of claim 9, further comprising:

when the driving frequency is changed, re-calculating an area-specific correction value using the black data voltage information; and controlling the data voltage generation of the data driver with respect to the area-specific correction value re-calculated using the black data voltage information.

14. The method of claim 9, further comprising:

searching for a black data voltage corresponding to a target luminance with respect to the first area of the display panel, wherein the first area is a reference area of the display panel;

calculating an area-specific weighted value with respect to the second area, and calculating a black data voltage corresponding to the target luminance; and storing information on the black data voltage in the memory storage as the black data voltage information.

15. The method of claim 14, wherein the reference area corresponds to a central area of the display panel.

16. The method of claim 14, wherein the black data voltage corresponds to a driving frequency, a dimming level, and a temperature of the display panel.

17. An electronic device comprising:

a display device configured to display an image;

a power device configured to supply power for an operation of the display device; and a processor configured to supply signals to the display device, wherein the display device includes:

a display panel including sub-pixels;

a data driver configured to provide the sub-pixels with a data voltage generated using a gamma reference voltage;

a driving controller configured to control the data driver; and a memory storage configured to provide the driving controller with black data voltage information of a first area of the display panel according to a target luminance corresponding to a given driving frequency, a dimming level, and a temperature of the display panel.

18. The electronic device of claim 17, wherein the driving controller is configured to calculate an area-specific correction value for a second area of the display panel using the black data voltage information.

19. The electronic device of claim 18, wherein the driving controller is configured to control the data driver to remap a relationship between the gamma reference voltage and the data voltage for the second area, using an area-specific black data set voltage and the area-specific correction value.

20. The electronic device of claim 19, wherein the driving controller is configured to generate an area-specific black data voltage of the second area, using the black data voltage information and the area-specific correction value, and wherein the driving controller is configured to transfer, to the data driver, the area-specific black data voltage, causing the data driver to remaps, for the second area, a relationship between the gamma reference voltage and the data voltage.

* * * * *